United States Patent
Lu (10) Patent No.: US 10,738,737 B2
(45) Date of Patent: Aug. 11, 2020

(54) SELF-LOCKING ALIGNMENT AT A NACELLE INTERFACE

(71) Applicant: Rohr, Inc., Chula Vista, CA (US)

(72) Inventor: Jinqiu Lu, Murrieta, CA (US)

(73) Assignee: Rohr, Inc., Chula Vista, CA (US)

(*) Notice: Subject to any disclaimer, the term of this patent is extended or adjusted under 35 U.S.C. 154(b) by 380 days.

(21) Appl. No.: 15/355,814

(22) Filed: Nov. 18, 2016

(65) Prior Publication Data

US 2018/0142645 A1    May 24, 2018

(51) Int. Cl.
| F02K 1/76 | (2006.01) |
| B64C 7/02 | (2006.01) |
| F02K 1/72 | (2006.01) |
| B64D 29/06 | (2006.01) |
| F02K 1/80 | (2006.01) |
| F02K 1/82 | (2006.01) |
| F02C 3/04 | (2006.01) |

(52) U.S. Cl.
CPC .............. *F02K 1/766* (2013.01); *B64C 7/02* (2013.01); *B64D 29/06* (2013.01); *F02K 1/72* (2013.01); *F02K 1/80* (2013.01); *F02K 1/82* (2013.01); *F02C 3/04* (2013.01)

(58) Field of Classification Search
None
See application file for complete search history.

(56) References Cited

U.S. PATENT DOCUMENTS

| 4,813,808 A | * | 3/1989 | Gehrke | .................... F16B 21/16 24/625 |
| 5,609,313 A | * | 3/1997 | Cole | ...................... B64D 29/00 244/54 |
| 6,237,325 B1 | | 5/2001 | Hogie et al. | |
| 6,340,135 B1 | | 1/2002 | Barton | |
| 7,503,425 B2 | | 3/2009 | Strunk | |
| 8,070,101 B2 | | 12/2011 | Vauchel et al. | |
| 8,181,905 B2 | | 5/2012 | McDonough et al. | |
| 8,919,693 B2 | | 12/2014 | Vauchel | |
| 9,169,026 B2 | | 10/2015 | Joret et al. | |

(Continued)

FOREIGN PATENT DOCUMENTS

| FR | 201550119 | * | 1/2015 | ............. B64D 29/00 |
| FR | 3031341 | | 7/2016 | |

OTHER PUBLICATIONS

Search report for EP17202439.0 dated Jan. 15, 2018.

*Primary Examiner* — Steven M Sutherland
*Assistant Examiner* — Rodolphe Andre Chabreyrie
(74) *Attorney, Agent, or Firm* — Getz Balich LLC (57) ABSTRACT

A nacelle is provided for an aircraft propulsion system. This nacelle include a nacelle structure, a fanlet and an interface assembly. The fanlet is configured to translate axially along a centerline between an open position and a closed position. The interface assembly includes first and second interlocking components. One of the interlocking components is mounted to the nacelle structure, and the other one of the interlocking components is mounted to the fanlet. The first interlocking component includes a projection configured with a stop. The second interlocking component includes an aperture and a detent. The projection is adapted to extend axially into the aperture. The detent is adapted to engage the stop where the fanlet is in the closed position.

18 Claims, 7 Drawing Sheets

(56) References Cited

U.S. PATENT DOCUMENTS

| | | | |
|---|---|---|---|
| 9,188,026 B2* | 11/2015 | Calder | B64D 29/06 |
| 9,211,956 B2 | 12/2015 | Joret et al. | |
| 9,249,756 B2 | 2/2016 | Caruel et al. | |
| 9,285,121 B2* | 3/2016 | Keener | F23R 3/10 |
| 2002/0039518 A1* | 4/2002 | Schwarz | B60R 13/0206 |
| | | | 403/329 |
| 2011/0014044 A1 | 1/2011 | Vauchel et al. | |
| 2012/0284975 A1* | 11/2012 | Clarke | B60R 13/0206 |
| | | | 24/595.1 |
| 2013/0220435 A1 | 8/2013 | James | |
| 2014/0352797 A1 | 12/2014 | Aten et al. | |
| 2015/0007896 A1 | 1/2015 | Joret et al. | |
| 2015/0121895 A1* | 5/2015 | Suciu | F02K 1/72 |
| | | | 60/796 |
| 2015/0292436 A1 | 10/2015 | Conet et al. | |
| 2017/0082064 A1* | 3/2017 | Tissot | F02K 1/09 |

* cited by examiner

SELF-LOCKING ALIGNMENT AT A NACELLE INTERFACE

BACKGROUND OF THE INVENTION

1. Technical Field

This disclosure relates generally to an aircraft propulsion system and, more particularly, to a nacelle with at least one translatable structure such as, for example, a translating fanlet.

2. Background Information

Some modern nacelle designs include a translatable structure such as a fanlet that meets another structure of the nacelle at an interface when stowed. Air turbulence, vibrations induced by turbine engine operation, and other effects may cause the translatable structure to move relative to the other structure at the interface when stowed. This relative movement may create excessive airflow impediments, which increase the amount of drag produced by the nacelle at the interface.

There is a need in the art for controlling the relative position and keep positive seal between structures of an aircraft nacelle at an interface between those structures.

SUMMARY OF THE DISCLOSURE

According to an aspect of the present disclosure, a nacelle is provided for an aircraft propulsion system. This nacelle includes a nacelle structure, a fanlet and an interface assembly. The fanlet is configured to translate axially along a centerline between an open position and a closed position. The interface assembly including first and second interlocking components. One of the first and the second interlocking components is mounted to the nacelle structure. The other one of the first and the second interlocking components is mounted to the fanlet. The first interlocking component includes or is otherwise configured as a projection configured with a stop. The second interlocking component includes an aperture and a detent. The projection is adapted to extend axially into the aperture. The detent is adapted to engage the stop where the fanlet is in the closed position.

According to another aspect of the present disclosure, a nacelle is provided for an aircraft propulsion system. This nacelle includes a forward nacelle structure, a second nacelle structure, a first interlocking component and a second interlocking component. The forward nacelle structure is configured to translate axially along a centerline between an open position and a closed position. The first interlocking component is mounted to the second nacelle structure. The first interlocking component is configured as or otherwise includes a projection configured with a stop. The second interlocking component is mounted to the forward nacelle structure. The second interlocking component includes an aperture and a detent. The projection is adapted to extend axially into the aperture. The detent is adapted to engage the stop where the forward nacelle structure is in the closed position.

According to still another aspect of the present disclosure, a nacelle is provided for an aircraft propulsion system. This nacelle includes a forward nacelle structure, a second nacelle structure, a first interlocking component and a second interlocking component. The forward nacelle structure is configured to translate axially along a centerline between an open position and a closed position. The first interlocking component is mounted to the forward nacelle structure. The first interlocking component is configured as or otherwise includes a projection configured with a stop. The second interlocking component is mounted to the second nacelle structure. The second interlocking component includes an aperture and a detent. The projection is adapted to extend axially into the aperture. The detent is adapted to engage the stop where the forward nacelle structure is in the closed position.

The projection may be configured as or otherwise include a pin. The stop may be configured as or otherwise includes a groove in the pin. The detent may be configured as or otherwise include a spring element adapted to engage the stop and thereby secure the forward nacelle structure in the closed position.

The nacelle may include a seal element adapted to seal an axial gap between the first and the second interlocking components. The seal element may extend circumferentially about the centerline.

The forward nacelle structure may include an inlet structure that interfaces with the second nacelle structure.

The projection may be configured as or otherwise include a pin. The stop may be configured as or otherwise include a groove in the pin.

The detent may be configured as or otherwise include a spring element adapted to engage the stop.

The detent may be configured as or otherwise include a plurality of spring elements adapted to engage the stop and arranged in an array that extends at least partially around the aperture.

The detent may be adapted to secure the fanlet in the closed position when engaged with the stop.

The first interlocking component may include a first mounting bracket. The projection may extend axially out from the first mounting bracket. The second interlocking component may include a second mounting bracket. The aperture may extend axially through the second mounting bracket. The first mounting bracket may be substantially parallel with the second mounting bracket.

The interface assembly may include a seal element adapted to seal an axial gap between the first and the second interlocking components.

The seal element may be configured as or otherwise include a tubular gasket.

The first interlocking component may be mounted to the fanlet and the second interlocking component may be mounted to the nacelle structure.

The second interlocking component may be mounted to the fanlet and the first interlocking component may be mounted to the nacelle structure.

The nacelle structure may be configured as or otherwise include an inner barrel comprising an acoustic panel. The inner barrel may be disposed within the fanlet.

The nacelle structure may be configured as or otherwise include a thrust reverser sleeve.

The fanlet may include an inlet structure and a fan cowl. The interface assembly may provide an interface between the inlet structure and the nacelle structure.

The fanlet may include an inlet structure and a fan cowl. The interface assembly may provide an interface between the fan cowl and the nacelle structure.

The first interlocking component may include a second projection configured with a second stop. The second interlocking component may include a second aperture and a second detent. The second projection may be adapted to extend axially into the second aperture and the second detent may be adapted to engage the second stop where the fanlet is in the closed position.

The foregoing features and the operation of the invention will become more apparent in light of the following description and the accompanying drawings.

DETAILED DESCRIPTION OF THE INVENTION

Figure 1:
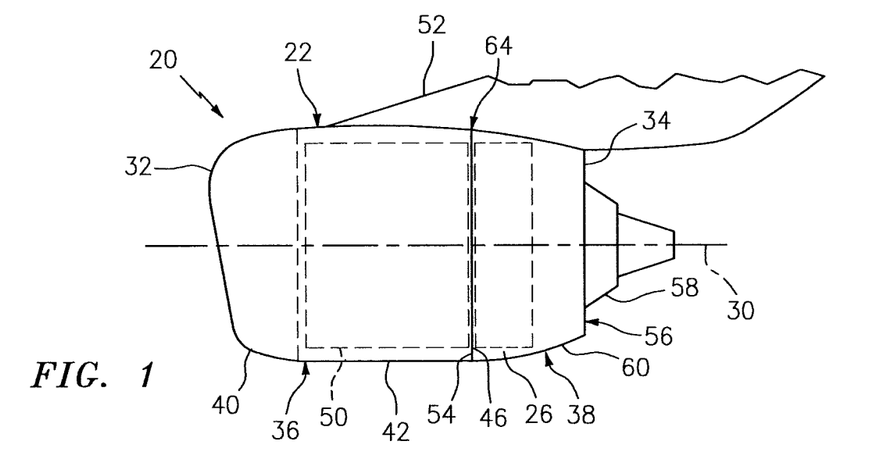
FIG. 1 is a side illustration of an aircraft propulsion system with a translatable fanlet and a translatable thrust reverser sleeve in stowed positions.
Figure 3:
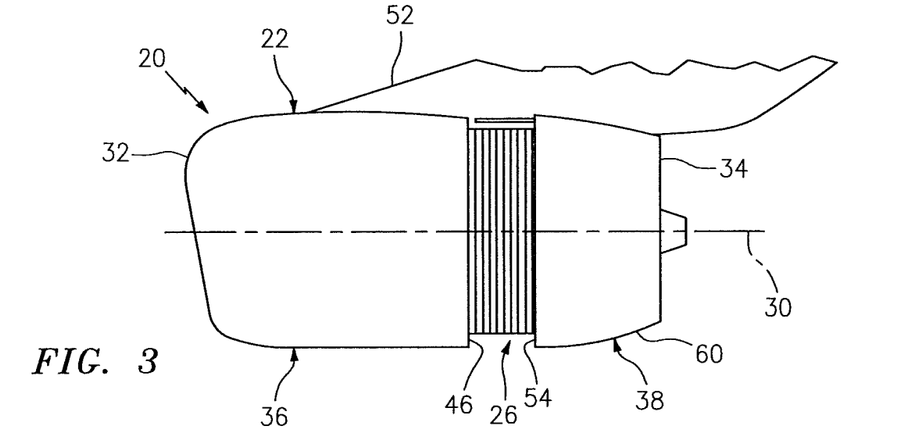
FIG. 3 is a side illustration of the aircraft propulsion system with the fanlet in the stowed position and the thrust reverser sleeve in a fully deployed position.

FIG. 1 illustrates an aircraft propulsion system 20 for an aircraft such as a commercial airliner. The propulsion system 20 includes a nacelle 22 and a gas turbine engine 24 (see FIG. 4). This gas turbine engine 24 (see also FIG. 4) may be configured as a turbofan engine. Alternatively, the gas turbine engine 24 may be configured as a turbojet engine or any other type of gas turbine engine capable of propelling the aircraft. The propulsion system 20 may also include a thrust reverser system 26 configured with the nacelle 22; see also FIG. 3. However, in alternative embodiments, the nacelle 22 may be configured without the thrust reverser.

Figure 4:
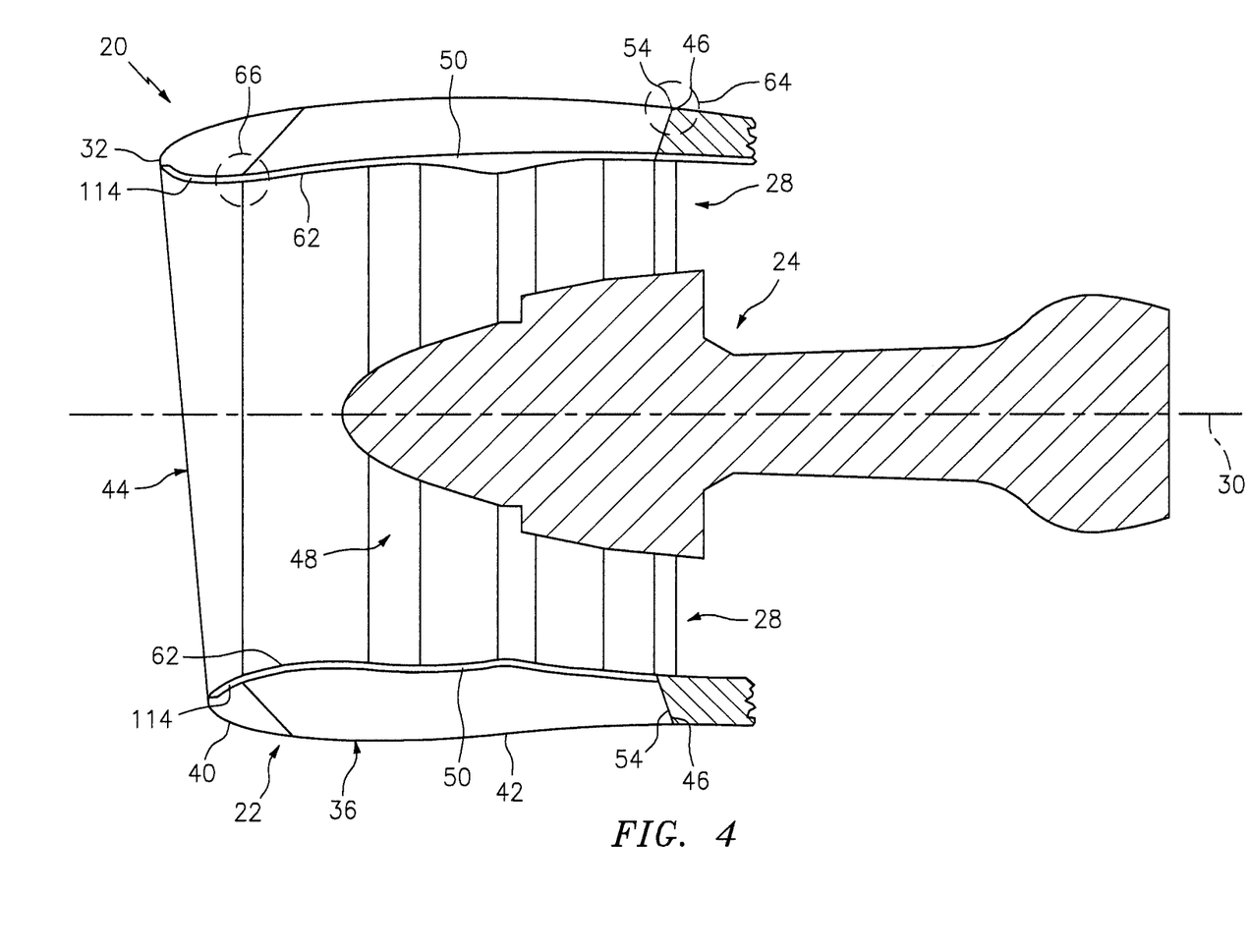
FIG. 4 is a side sectional illustration of a portion of the aircraft propulsion system.

The nacelle 22 of FIG. 1 circumscribes the gas turbine engine 24 to provide an aerodynamic covering for the gas turbine engine 24 (see also FIG. 4). The nacelle 22 also forms a bypass gas path 28 (see FIG. 4) with the gas turbine engine 24 (see also FIG. 4), whereby air from the engine's turbofan is routed through the bypass gas path 28 and around a core of the gas turbine engine 24 and generates a majority (e.g., more than 75%) of engine thrust out of the aircraft propulsion system 20 in the case of a turbofan engine configuration.

Figure 2:
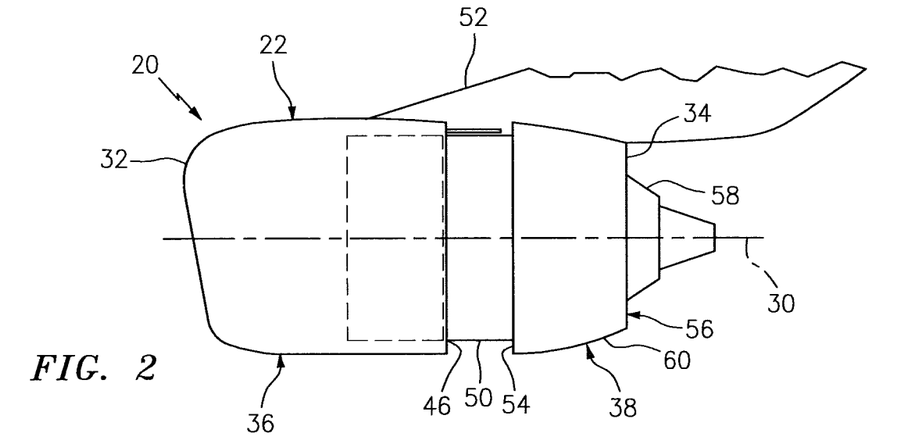
FIG. 2 is a side illustration of the aircraft propulsion system with the fanlet in a partially deployed position and the thrust reverser sleeve in the stowed position.

The nacelle 22 of FIGS. 1 and 2 extends along an axial centerline 30 between a forward nacelle end 32 and an aft nacelle end 34. The nacelle 22 includes a forward nacelle structure 36 and an aft nacelle structure 38.

The forward nacelle structure 36 may be configured as a fanlet, and is referred to below as fanlet 36 for ease of description. This fanlet 36 includes an inlet structure 40 (e.g., cowl or module) and a fan cowl 42. Of course, in other embodiments, the fanlet 36 may also include one or more additional structures/components.

The inlet structure 40 is disposed at the forward nacelle end 32. The inlet structure 40 is configured to direct a stream of air through an inlet orifice 44 (see FIG. 4) at the forward nacelle end 32 and into the propulsion system 20 towards the gas turbine engine 24 (see also FIG. 4). The fan cowl 42 is disposed at an aft end 46 of the fanlet 36 and extends axially between the inlet structure 40 and the aft nacelle structure 38. The fan cowl 42 may be generally axially aligned with a fan section 48 (see FIG. 4) of the gas turbine engine 24 (see also FIG. 4). The fan cowl 42 is configured to provide an aerodynamic covering for a fan case 50 (see also FIG. 2) which circumscribes the fan section 48.

Referring to FIGS. 1 and 2, the fanlet 36 is configured as a cohesive, translatable structure. In particular, the inlet structure 40 forms a forward portion of the fanlet 36 and the fan cowl 42 forms an aft portion of the fanlet 36. The fanlet 36 is slidably connected to a stationary structure, such as a pylon 52 for the aircraft propulsion system 20 (or another structure such as the fan case 50, etc.), through rails (see FIG. 2) mounted on opposing sides of the stationary structure and/or other suitable translatable joints. In this manner, the entire fanlet 36 including the inlet structure 40 and the fan cowl 42 may translate axially along the centerline 30 as shown in FIGS. 1 and 2. The fanlet 36 may thereby move axially between a closed/stowed position (see FIG. 1) and a fully open/deployed position, where FIG. 2 illustrates the fanlet 36 in a partially-open/deployed position. In the closed position, the inlet structure 40 and the fan cowl 42 provide the functionality described above. In the partially-open position and the fully open position, the fanlet 36 at least partially (or substantially completely) uncovers at least the fan case 50 and devices and systems mounted thereto (not shown for ease of illustration). This may facilitate propulsion system 20 assembly and maintenance.

Referring to FIG. 1, the aft nacelle structure 38 is disposed at the aft nacelle end 34 and extends axially between a forward end 54 thereof and the aft nacelle end 34. The aft nacelle structure 38 is configured to provide an outer boundary for an axial portion of the bypass gas path 28 (see also FIG. 4), which extends through the propulsion system 20 to a bypass gas path exhaust nozzle 56. The aft nacelle structure 38 may also form the exhaust nozzle 56 in conjunction with an inner fairing assembly 58 (e.g., an inner fixed structure), which houses the core of the gas turbine engine 24 (see also FIG. 4). The aft nacelle structure 38 may be configured as or otherwise include a thrust reverser sleeve 60 for the thrust reverser system 26, which may also be referred to as a translating sleeve. The aft nacelle structure 38 may also include other components such as, but not limited to, blocker doors, etc.

The thrust reverser sleeve 60 may have a substantially tubular unitary sleeve body; e.g., may extend more than 330 degrees around the centerline 30. Alternatively, the thrust reverser sleeve 60 may include a pair of sleeve segments (e.g., halves) arranged on opposing sides of the propulsion system 20. The present disclosure, however, is not limited to the foregoing exemplary sleeve configurations.

Referring to FIG. 4, the nacelle 22 may also include an acoustic inner barrel 62 configured with one or more noise attenuating acoustic panels. The inner barrel 62 is disposed radially within a cavity formed by the fanlet 36. The inner barrel 62 extends circumferentially around the centerline 30. The inner barrel 62 extends axially between the inlet structure 40 and the fan case 50. An aft end portion of the inner barrel 62 is fixedly mounted to a forward end portion of the fan case 50, for example, by a plurality of fasteners; e.g., bolts. Thus, the inner barrel 62 is a stationary structure of the nacelle 22.

In the closed position of FIG. 1, the fanlet 36 axially engages the aft nacelle structure 38 at an aft interface 64. In the closed position of FIG. 4, the fanlet 36 axially engages the inner barrel 62 at a forward interface 66.

Figure 5:
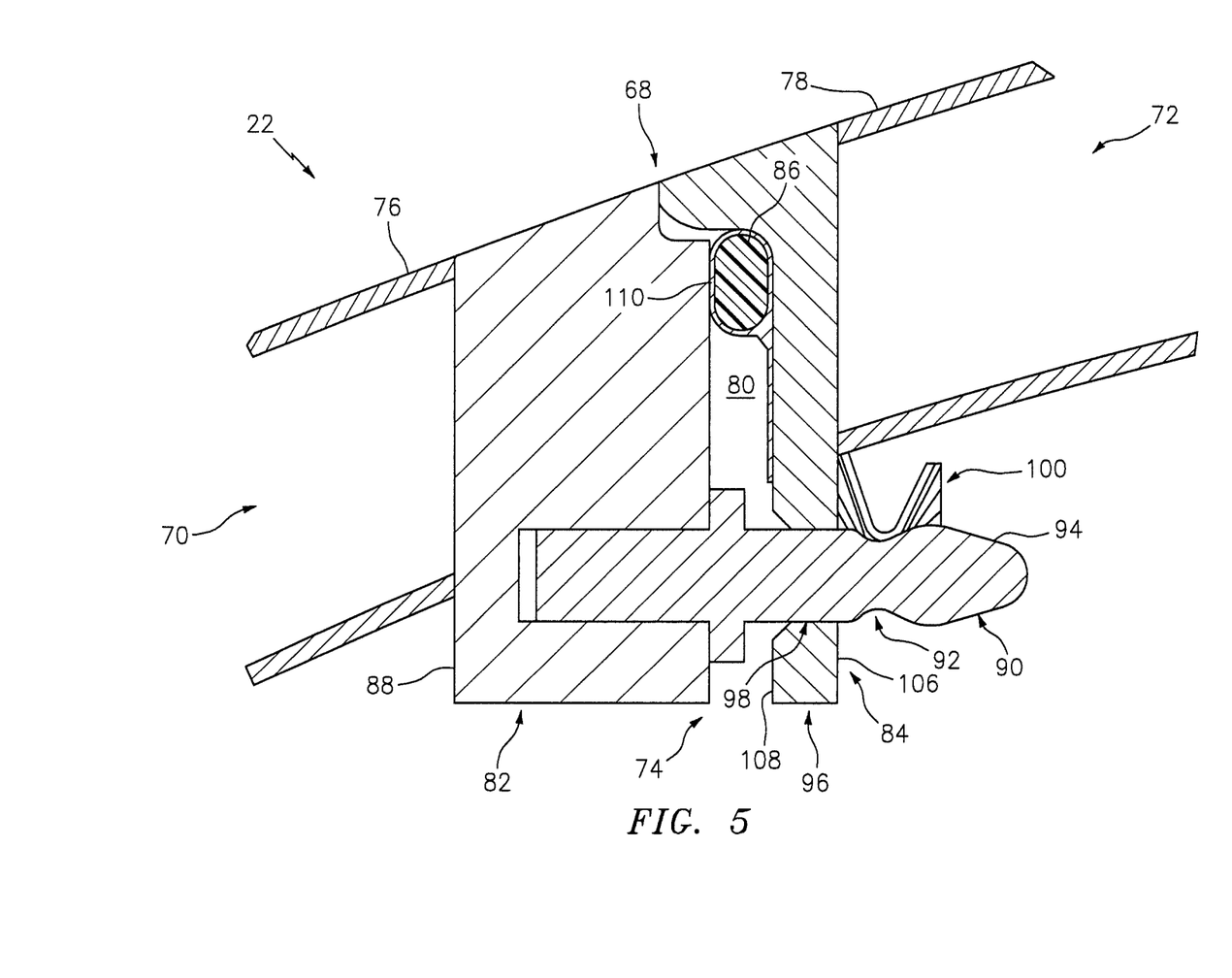
FIG. 5 is a side sectional illustration of a nacelle at an interface between a first nacelle structure and a second nacelle structure.

FIG. 5 illustrates an exemplary embodiment of an interface 68 between a first nacelle structure 70 and a second nacelle structure 72. This interface 68 may be representative of the aft interface 64 of FIG. 1 and/or the forward interface 66 of FIG. 4. For example, the first nacelle structure 70 may be configured as the fanlet 36 and, more particularly, as the inlet structure 40 where the second nacelle structure 72 is configured as the inner barrel 62, or vice versa. Alternatively, the first nacelle structure 70 may be configured as the fan cowl 42 where the second nacelle structure 72 is configured as the aft nacelle structure 38, or vice versa.

The nacelle 22 includes an interface assembly 74 to facilitate the engagement between the first nacelle structure 70 and the second nacelle structure 72. The interface assembly 74 of FIG. 5 is configured to (e.g., circumferentially and/or radially) align the first nacelle structure 70 with the second nacelle structure 72. Such alignment may ensure a smooth transition between aerodynamic flow surfaces 76 and 78 of the nacelle structures 70 and 72. The interface assembly 74 is configured to maintain a predetermined axial gap between the first nacelle structure 70 and the second nacelle structure 72. The interface assembly 74 is configured to secure (e.g., self-lock) the first nacelle structure 70 with the second nacelle structure 72. The interface assembly 74 is also configured to seal a (e.g., axial) gap 80 between the first nacelle structure 70 and the second nacelle structure 72.

Figure 6:
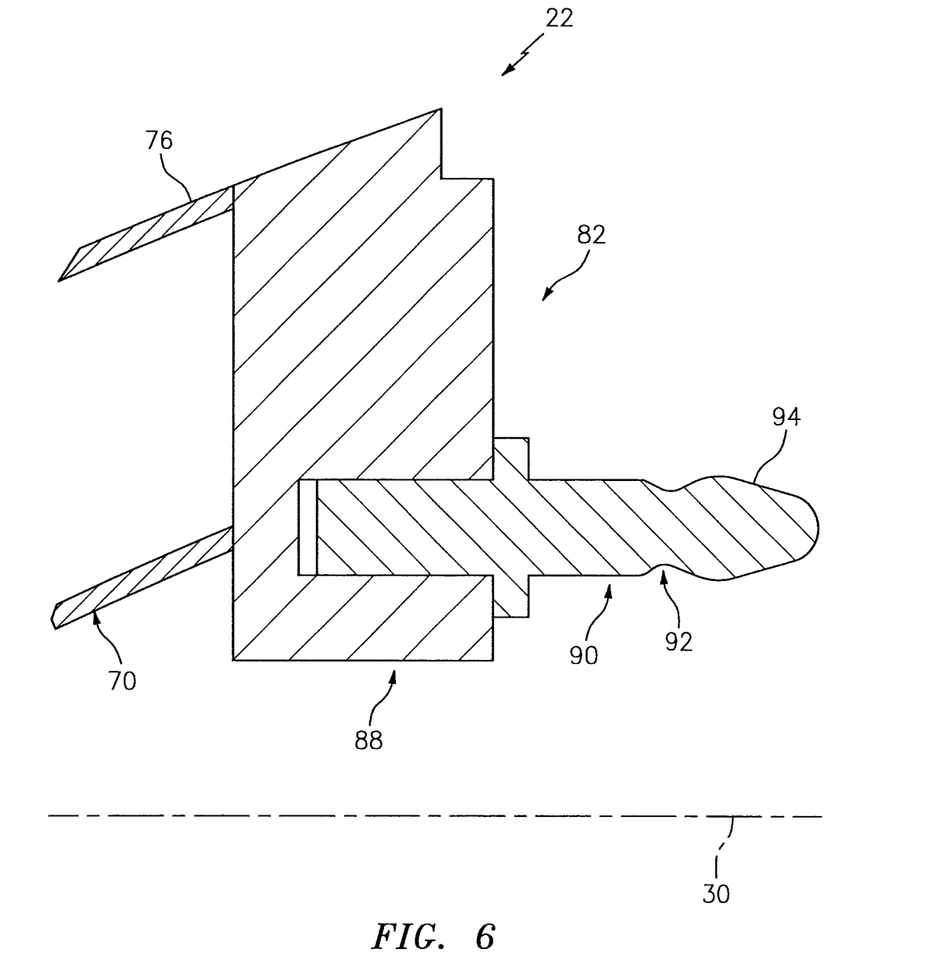
FIG. 6 is a side sectional illustration of the first nacelle structure with a first interlocking component.

The interface assembly 74 of FIG. 5 includes a pair of interlocking components 82 and 84 and a seal element 86. Referring to FIG. 6, the first interlocking component 82 includes a first mounting bracket 88 and one or more projections 90. The first mounting bracket 88 may be configured as a mounting ring and/or an annular or parti-annular flange. This first mounting bracket 88 is mechanically fastened, bonded and/or otherwise attached to the first nacelle structure 70. Alternatively, the first mounting bracket 88 may be configured as an integral part of the first nacelle structure 70.

The projections 90 are arranged about the centerline 30 in an annular array. Each projection 90 of FIG. 6 is configured as a generally cylindrical pin. Each projection 90 of FIG. 6 also includes a stop 92, which may be configured as a depression (e.g., a groove). In the embodiment of FIG. 6, the stop 92 is configured as an annular groove in the projection 90 proximate a tapered distal end 94 of the projection 90. Each of the projections 90 is connected (e.g., attached) to the first mounting bracket 88, and projects axially out from the first mounting bracket 88 in a direction that is going away from the first nacelle structure 70.

Figure 7:
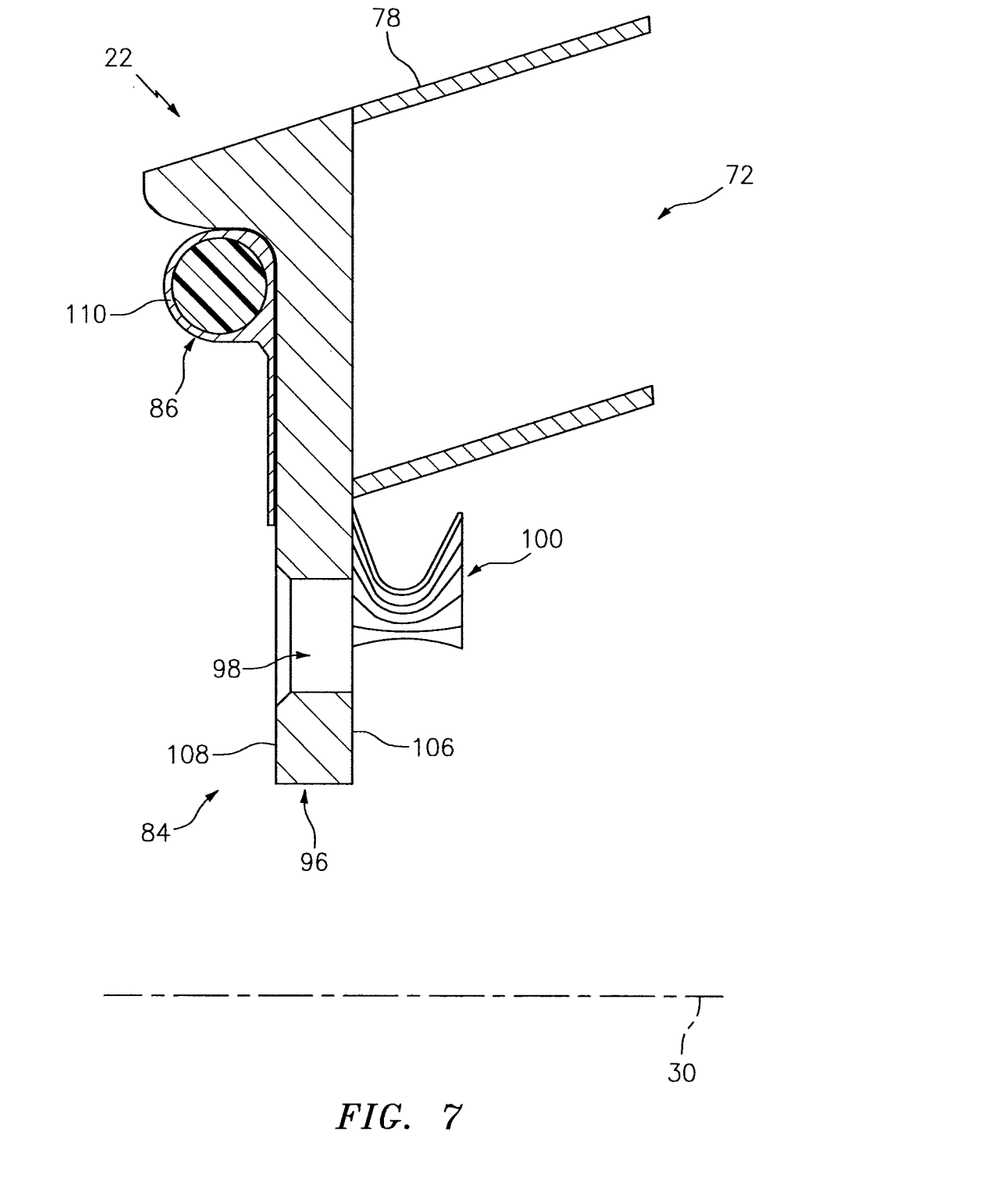
FIG. 7 is a side sectional illustration of the second nacelle structure with a second interlocking component.

Referring to FIG. 7, the second interlocking component 84 includes a second mounting bracket 96, one or more apertures 98 and one or more detents 100. The second mounting bracket 96 may be configured as a mounting ring and/or an annular or parti-annular flange. This second mounting bracket 96 is mechanically fastened, bonded and/or otherwise attached to the second nacelle structure 72. Alternatively, the second mounting bracket 96 may be configured as an integral part of the second nacelle structure 72. In the embodiment of FIG. 5, the second mounting bracket 96 (or at least a surface thereof) is arranged to be substantially parallel with the first mounting bracket 88 (or at least a surface thereof); however, the present disclosure is not limited to such a configuration.

The apertures 98 of FIG. 7 are arranged about the centerline 30 in an annular array. Each aperture 98 of FIG. 7 is configured as a through-hole that extends axially through the second mounting bracket 96. Each aperture 98 is sized to receive a respective one of the projections 90; see FIG. 5.

Figure 8:
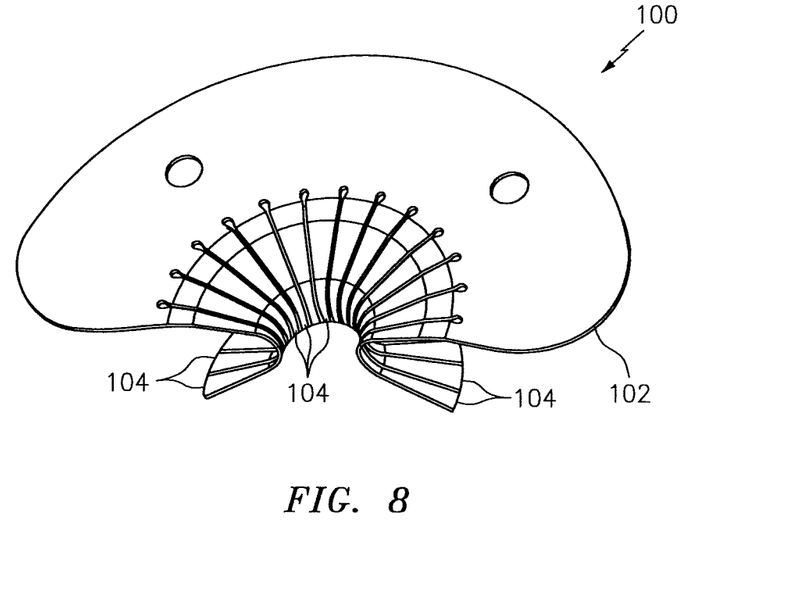
FIG. 8 is a perspective illustration of a detent.
Figure 9:
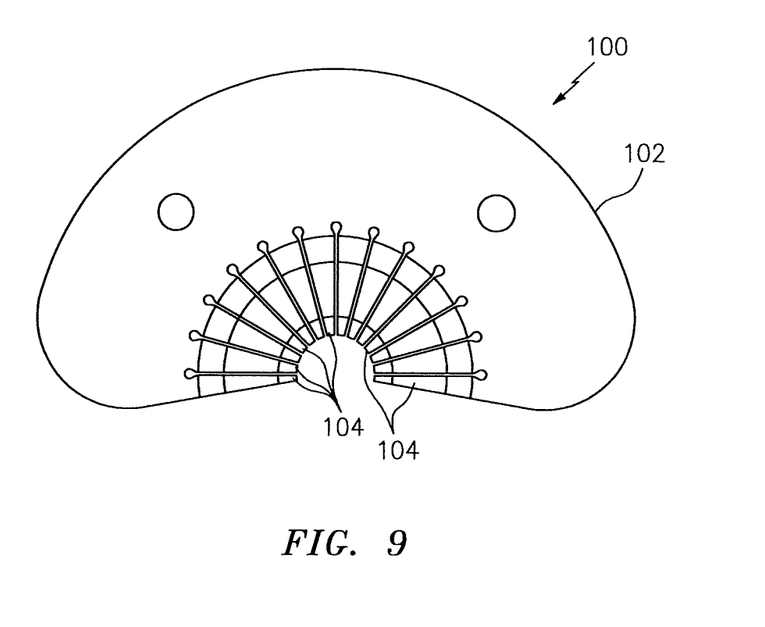
FIG. 9 is an end view illustration of the detent.

The detents 100 are arranged about the centerline 30 in an annular array, where each detent 100 is disposed with a respective one of the apertures 98. Referring to FIGS. 8 and 9, each detent 100 includes a base 102 and one or more spring elements 104; e.g., cantilevered leaf springs. The spring elements 104 are connected to and cantilevered off of the base 102. The spring elements 104 are arranged in an array (e.g., an arcuate array) that extends at least partially around a respective one of the apertures 98; e.g., see FIG. 7. Referring to FIG. 7, the base 102 is connected to a back side 106 of the second mounting bracket 96, where an opposing front side 108 of the second mounting bracket 96 faces the first mounting bracket 88 as best seen in FIG. 5. With this configuration, each projection 90 in FIG. 5 extends axially through a respective one of the apertures 98 and then engages a respective one of the detents 100. One or more of the spring elements 104 of that detent 100 engage the stop 92 (e.g., project into the groove) and thereby secure the stop 92 and the second nacelle structures 70 and 72 together. The combination of the projections 90 and detents 100 thereby may provide a self-locking alignment at the interface 68.

Referring to FIG. 7, the seal element 86 may be configured as or otherwise include a tubular gasket 110. The seal element 86 extends circumferentially around the centerline 30 along the front side 108 of the second mounting bracket 96. The seal element 86 of FIG. 7 is arranged radially between the apertures 98 and the aerodynamic flow surface 78 of the second nacelle structure 72; however, the present disclosure is not limited to such a seal element location. The seal element 86 is configured to be compressed between the second mounting bracket 96 and the first mounting bracket 88 as shown in FIG. 5 in order to substantially seal the axial gap 80 between those brackets 88 and 96 and, thus, the nacelle structures 70 and 72.

Figure 10:
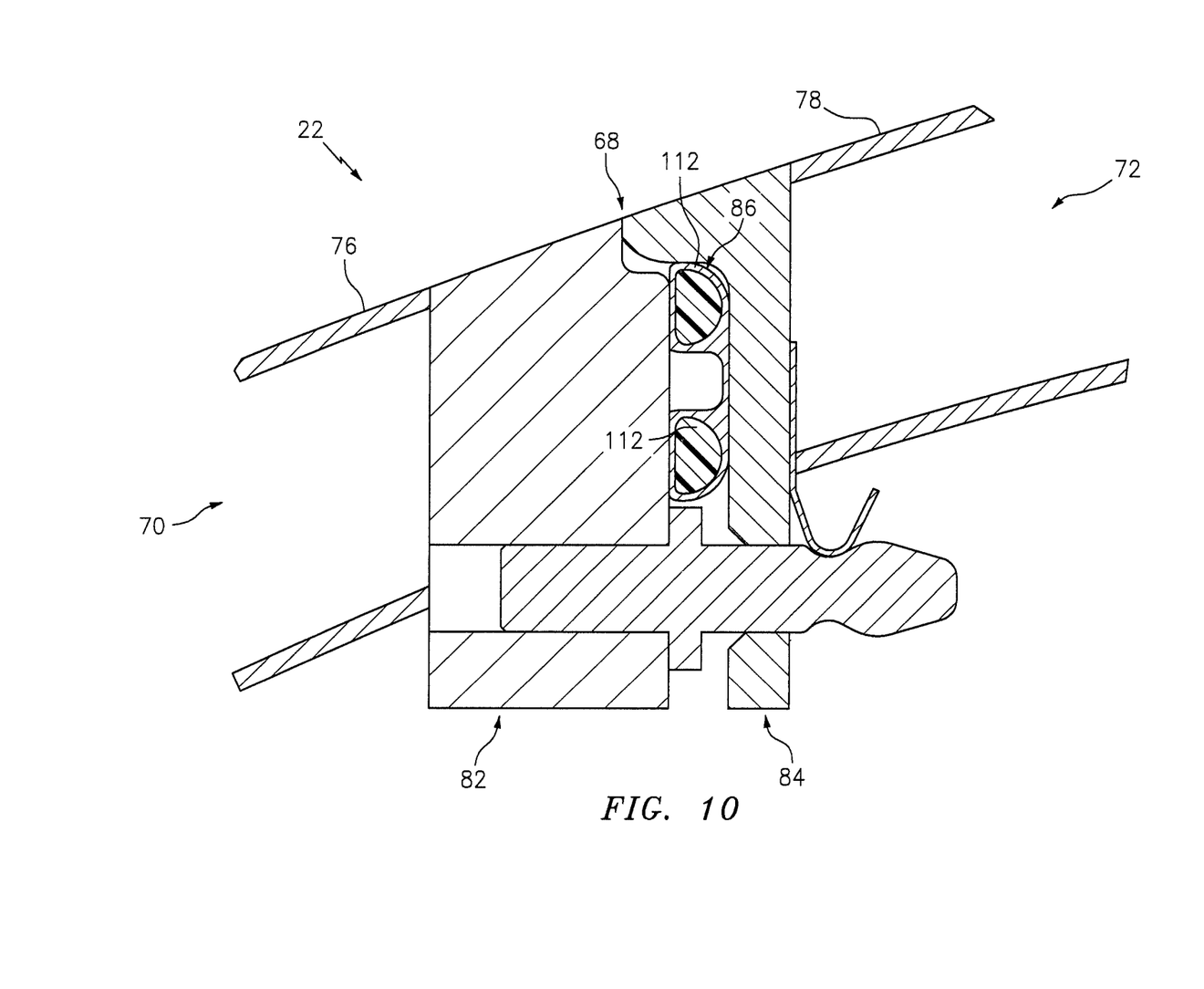
FIG. 10 is a side sectional illustration of another nacelle at an interface between a first nacelle structure and a second nacelle structure.

In some embodiments, the seal element 86 may be configured with a plurality of tubular gaskets 112 as shown in FIG. 10. In this embodiment, the tubular gaskets 112 may be substantially parallel and concentric with one another. Of course, in other embodiments, the seal element 86 may also or alternatively include various other seals; e.g., rope seals, solid polymer seals, etc.

In some embodiments, the inlet structure 40 may include one or more noise attenuating acoustic panels 114 as shown in FIG. 4.

In some embodiment, the inner barrel 62 may be included as part of the forward nacelle structure 36. In such embodiments, the forward nacelle structure 36 may engage the fan case 50 at the forward interface 66.

In some embodiments, the forward nacelle structure 36 may engage a stationary support structure for the nacelle 22 at the aft interface 64 instead of the aft nacelle structure 38. An example of such a stationary support structure is a torque box for the thrust reverser.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A nacelle for an aircraft propulsion system, comprising:
a nacelle structure;
a fanlet configured to translate axially along a centerline between an open position and a closed position; and
an interface assembly including first and second interlocking components, wherein one of the first and the second interlocking components is mounted to the nacelle structure, and the other one of the first and the second interlocking components is mounted to the fanlet;
the first interlocking component comprising a projection configured with a stop;
the second interlocking component comprising an aperture and a detent;
the projection comprising a pin, and the projection adapted to extend axially into the aperture and the detent adapted to engage the stop where the fanlet is in the closed position;
the stop comprising a groove in the pin; and
the detent comprising a plurality of spring elements and a base, wherein
the base is connected to a back side of the second interlocking component and extends circumferentially partially around the projection within opposing circumferential sides of the base and the plurality of spring elements is cantilevered from the base and extends circumferentially and partially around the pin within the opposing circumferential sides where the fanlet is in the closed position,
each of the spring element of the plurality of spring elements adapted to project into the groove in the pin, and the spring elements comprising
a first spring element,
a second spring element and
a third spring element;
the first spring element including
a first end segment,
a second end segment and
a curved intermediate segment between and connecting the first end segment and the second end segment, wherein
the first end segment projecting out from the base towards the curved intermediate segment and the second end segment projecting away from the curved intermediate segment and overlapping the first end segment.

2. The nacelle of claim 1, wherein the detent is adapted to secure the fanlet in the closed position when engaged with the stop.

3. The nacelle of claim 1, wherein
the first interlocking component further comprises a first mounting bracket, and the projection extends axially out from the first mounting bracket;
the second interlocking component further comprises a second mounting bracket, and the aperture extends axially through the second mounting bracket; and
the first mounting bracket is substantially parallel with the second mounting bracket.

4. The nacelle of claim 1, wherein the interface assembly further includes a seal element adapted to seal an axial gap between the first and the second interlocking components.

5. The nacelle of claim 4, wherein the seal element comprises a tubular gasket.

6. The nacelle of claim 1, wherein the first interlocking component is mounted to the fanlet and the second interlocking component is mounted to the nacelle structure.

7. The nacelle of claim 1, wherein the second interlocking component is mounted to the fanlet and the first interlocking component is mounted to the nacelle structure.

8. The nacelle of claim 1, wherein the nacelle structure comprises an inner barrel comprising an acoustic panel, and the inner barrel is disposed within the fanlet.

9. The nacelle of claim 1, wherein the nacelle structure comprises a thrust reverser sleeve.

10. The nacelle of claim 1, wherein the fanlet includes an inlet structure and a fan cowl, and the interface assembly provides an interface between the inlet structure and the nacelle structure.

11. The nacelle of claim 1, wherein the fanlet includes an inlet structure and a fan cowl, and the interface assembly provides an interface between the fan cowl and the nacelle structure.

12. The nacelle of claim 1, wherein
the first interlocking component further comprises a second projection configured with a second stop;
the second interlocking component further comprises a second aperture and a second detent; and
the second projection is adapted to extend axially into the second aperture and the second detent is adapted to engage the second stop where the fanlet is in the closed position.

13. A nacelle for an aircraft propulsion system, comprising:
a forward nacelle structure configured to translate axially along a centerline between an open position and a closed position;
a second nacelle structure;
a first interlocking component mounted to the forward nacelle structure, the first interlocking component comprising
a projection configured with a stop; and
a second interlocking component mounted to the second nacelle structure, the second interlocking component comprising
an aperture and a detent;
the projection adapted to extend axially into the aperture and the detent adapted to engage the stop where the forward nacelle structure is in the closed position;
the stop comprising a groove in the projection; and
the detent comprising a plurality of spring elements and a base, wherein
and a base, wherein
the base is connected to a back side of the second interlocking component and extends circumferentially partially around the projection within opposing circumferential sides of the base and the plurality of spring elements extends circumferentially and partially around the projection within the opposing circumferential sides around the projection where the forward nacelle structure is in the closed position, each of the spring element of the plurality of spring elements adapted to directly engage the groove in the projection and thereby secure the forward nacelle structure in the closed position, and a first of the spring elements including a first segment and a second segment that radially overlaps the first segment.

14. The nacelle of claim 13, further comprising a seal element adapted to seal an axial gap between the first and the second interlocking components, the seal element extending circumferentially about the centerline.

15. The nacelle of claim 13, wherein the forward nacelle structure includes an inlet structure that interfaces with the second nacelle structure.

16. A nacelle for an aircraft propulsion system, comprising:
   a forward nacelle structure configured to translate axially along a centerline between an open position and a closed position;
   a second nacelle structure;
   a first interlocking component mounted to the second nacelle structure, the first interlocking component comprising
      a projection configured with a stop; and
   a second interlocking component mounted to the forward nacelle structure, the second interlocking component comprising
      an aperture and
      a detent;
      the projection adapted to extend axially into the aperture; and
      the detent including a base and a plurality of spring elements connected to and cantilevered from the base, the base connected to a back side of the second mounting bracket and extending circumferentially partially around the projection within opposing circumferential sides of the base where the forward nacelle structure is in the closed position, the spring elements arranged circumferentially and partially around the projection within the opposing circumferential sides and engaged with the stop where the forward nacelle structure is in the closed position, and the plurality of spring elements comprising a first spring element, a second spring element and a third spring element.

17. The nacelle of claim 16, wherein the stop comprises a groove in the projection; and the plurality of spring elements projects into the groove in the projection where the forward nacelle structure is in the closed position.

18. The nacelle of claim 13, wherein the spring elements include a first spring element, a second spring element and a third spring element.

* * * * *